US008897167B2

(12) United States Patent
Simmons et al.

(10) Patent No.: US 8,897,167 B2
(45) Date of Patent: *Nov. 25, 2014

(54) DIVERSITY MONITORING FOR COMMUNICATION NETWORK CIRCUITS

(71) Applicant: AT&T Intellectual Property I, L.P., Atlanta, GA (US)

(72) Inventors: Jacqueline S. Simmons, Davie, FL (US); Christopher O. Brown, Ponte Vedra Beach, FL (US); Charles Richard Grafton, Lawrenceville, GA (US); Anil Tagore Gundugollu, Duluth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,219

(22) Filed: Aug. 5, 2013

(65) Prior Publication Data

US 2013/0315073 A1 Nov. 28, 2013

Related U.S. Application Data

(63) Continuation of application No. 12/562,462, filed on Sep. 18, 2009, now Pat. No. 8,503,314.

(51) Int. Cl.
*H04L 12/26* (2006.01)
*H04L 12/24* (2006.01)

(52) U.S. Cl.
CPC .............. *H04L 41/064* (2013.01); *H04L 12/26* (2013.01)
USPC ........................................................ 370/252

(58) Field of Classification Search
USPC ........................................................ 370/252
See application file for complete search history.

(56) References Cited

U.S. PATENT DOCUMENTS

| 6,147,980 | A  | 11/2000 | Yee et al. |
| 6,643,837 | B2 | 11/2003 | Campbell et al. |
| 6,802,044 | B2 | 10/2004 | Campbell et al. |
| 6,944,722 | B2 | 9/2005  | Cantrill |
| 7,236,587 | B2 | 6/2007  | Zerressen |
| 7,325,185 | B1 | 1/2008  | Szor |
| 2009/0245116 | A1 | 10/2009 | McGuffin et al. |

OTHER PUBLICATIONS

Office Action mailed May 23, 2011 in U.S. Appl. No. 12/562,462, filed Sep. 18, 2009.
Office Action mailed Sep. 14, 2011 in U.S. Appl. No. 12/562,462, filed Sep. 18, 2009.
Office Action mailed Jan. 4, 2012 in U.S. Appl. No. 12/562,462, filed Sep. 18, 2009.
Office Action mailed Apr. 17, 2012 in U.S. Appl. No. 12/562,462, filed Sep. 18, 2009.
Office Action mailed Aug. 31, 2012 in U.S. Appl. No. 12/562,462, filed Sep. 18, 2009.
Notice of Allowance mailed Mar. 26, 2013 in U.S. Appl. No. 12/562,462, filed Sep. 18, 2009.

*Primary Examiner* — Mark Rinehart
*Assistant Examiner* — Gbemileke Onamuti
(74) *Attorney, Agent, or Firm* — Hartman & Citrin LLC

(57) ABSTRACT

Methods, systems, and computer-readable media are provided for monitoring circuit diversity within a communications network. Information is gathered regarding circuits within the communications network. Diversity rules for the circuits are received. The diversity rules may limit the sharing of network resource between primary and secondary circuit pairs. The information regarding the circuits is analyzed to identify violations of the diversity rules. A report on the violations of the diversity rules is generated.

20 Claims, 4 Drawing Sheets

Fig. 1   CIRCUITS 120 INTERCONNECTING FACILITIES 110

DIVERSITY MONITORING FOR COMMUNICATION NETWORK CIRCUITS

CROSS-REFERENCE TO RELATED APPLICATIONS

This application is a continuation of U.S. patent application Ser. No. 12/562,462, now U.S. Pat. No. 8,503,314, filed Sep. 18, 2009, entitled "Diversity Monitoring For Communication Network Circuits," which is hereby incorporated by reference in its entirety.

BACKGROUND

This application related generally to the field of communication networks. More specifically, the disclosure provided herein relates to monitoring circuit diversity within a communications network.

Communication networks may be used to support voice, data, video, or other traffic for various applications. Critical applications may impose level of service requirements on providers of the networks or circuits within the networks. Circuits within networks may interconnect two nodes of the network. Circuits may be made up of one or more links that provide hops from node to node between the start node and end node of the circuit.

Level of service requirements may expect diversity for circuits, links, or resources associated with the circuits. For example, a level of service for a critical circuit may expect there to be a backup circuit. As an example of diversity, the backup circuit can be physically separated from the primary circuit. With such diversity, failure of the primary circuit is less likely to imply failure of the backup as well. If both the primary circuit and the backup circuit use fibers or cables within the same conduit, cutting of the conduit may shut down both circuits.

Traditional communication networks may merely hope that a network architecture provides a backup path through the network should the primary path suffer a failure. Even where critical circuits may be identified to ensure backups, traditional techniques can require manual examination of the circuit routes to evaluate diversity for the critical circuits. Such manual examination does not scale with network complexity or changing service requirements. Manual examination of network route details is tedious and time consuming and increases a potential for human error.

SUMMARY

Embodiments of the disclosure presented herein include methods, systems, and computer-readable media for monitoring circuit diversity within a communications network. According to one aspect, a method for monitoring a communications network is provided. According to the method, information regarding circuits within the communications network is gathered. Diversity rules for the circuits are received. The information regarding the circuits is analyzed to identify violations of the diversity rules. A report on the violations of the diversity rules is generated.

According to another aspect, a system for monitoring a communications network is provided. The system includes a memory and a processor functionally coupled to the memory. The memory stores a program containing code for monitoring a communications network. The processor is responsive to computer-executable instructions contained in the program and configured to gather information regarding circuits within the communications network. Diversity rules for the circuits are received by the processor. The information regarding the circuits is analyzed by the processor to identify violations of the diversity rules. A report on the violations of the diversity rules is generated.

According to yet another aspect, a computer-readable medium having instructions stored thereon for execution by a processor to perform a method for monitoring a communications network is provided. According to the method, information regarding circuits within the communications network is gathered. Diversity rules for the circuits are received. The information regarding the circuits is analyzed to identify violations of the diversity rules. A report on the violations of the diversity rules is generated.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for monitoring diversity in communication network circuits. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
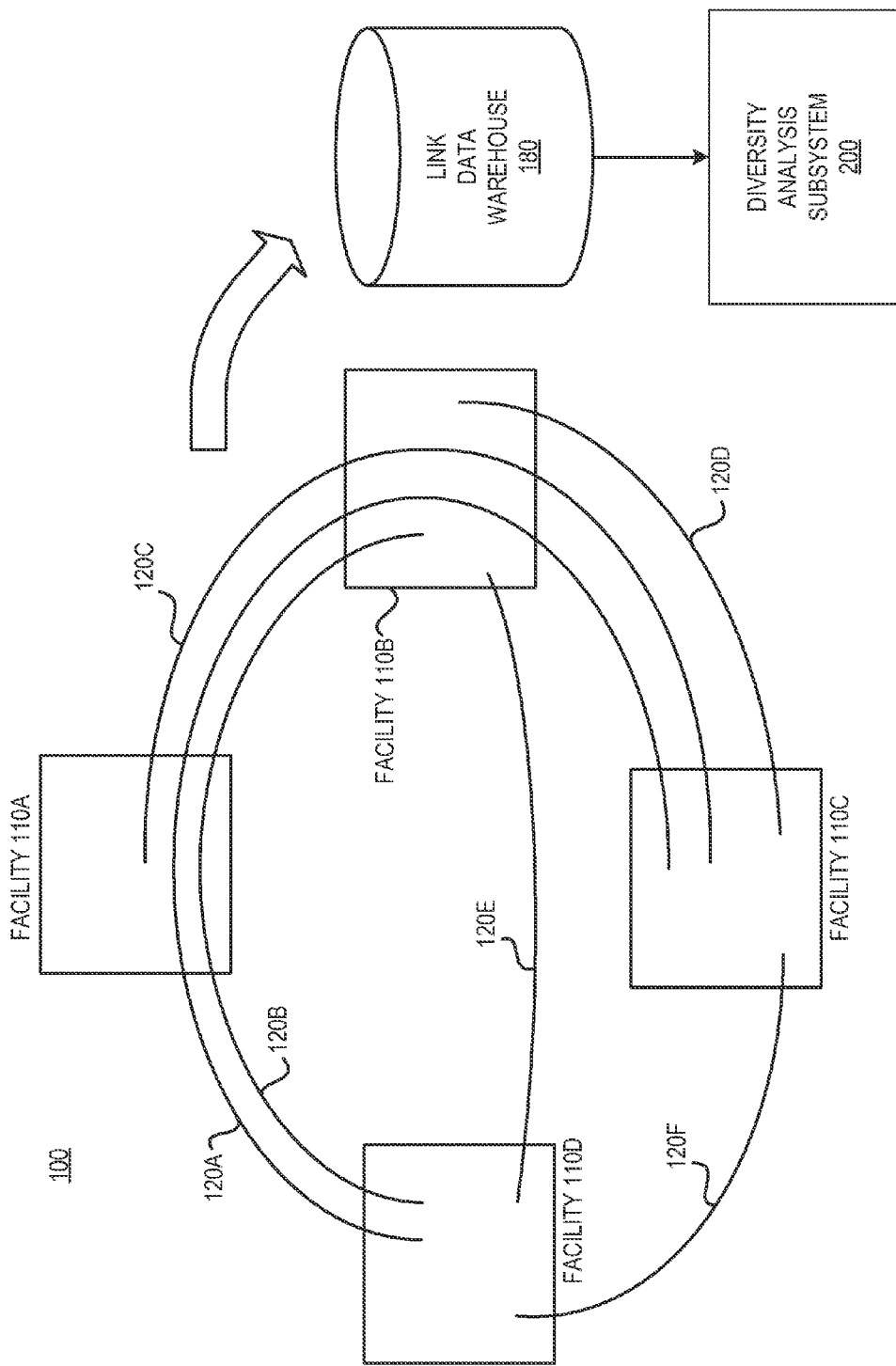
FIG. 1 is a block diagram illustrating a communication network architecture with a diversity analysis subsystem, in accordance with one or more embodiments presented herein.

In the following detailed description, references are made to the accompanying drawings that form a part hereof, and which are shown by way of illustration, specific embodiments, or examples. Referring now to the drawings, in which like numerals represent like elements through the several figures, systems and methodologies for monitoring diversity in communication network circuits are provided. In particular, FIG. 1 illustrates a communication network architecture 100 with a diversity analysis subsystem 200 according to some embodiments. A communications network can include circuits such as illustrated circuits 120A-120F. The circuits 120A-120F may be referred to collectively or generically as circuits 120. According to various embodiments, the circuits 120 may be optical fibers, wavelengths within optical fibers, wired connections, wireless connections, radio frequency (RF) links, free-space optical links, or any time-slotted, packetized, or otherwise partitioned subdivision thereof. The circuits 120 may connect between or pass through facilities 110A-110D. The facilities 110A-110D may be referred to collectively or generically as facilities 110.

According to various embodiments, the facilities 110 may each be buildings or locations such as a central office (CO), a point of presence (POP), a switching station, a customer site, or any other geographical location of a network node or endpoint. According to other embodiments, the facilities 110 may each be buildings, floors, or wiring closets within a campus, a metropolitan area network (MAN), a wide area network (WAN), a local area network (LAN), or any other scale of network. According to still other embodiments, the facilities 110 may each be communication equipment devices, equipment racks, equipment cabinets, or other locations within a network installation. It should be appreciated that the facilities 110 may be buildings or geographical locations according to the scale of some embodiments, while the facilities 110 may be switches or equipment racks according to the scale of other embodiments. Furthermore, various other scales of the network facilities 110 may relate to various embodiments of the technology presented herein without departing from the spirit or scope of the disclosure.

The circuit 120A can connect between the facility 110D and facility 110C while passing through the facility 110A and facility 110B. The circuit 120B can connect between the facility 110D and facility 110B while passing through the facility 110A. The circuit 120C can connect between the facility 110A and facility 110C while passing through facility 110B. Circuit 120D can connect directly between the facility 110B and facility 110C. The circuit 120E can connect directly between the facility 110D and facility 110B. Lastly, circuit 120F can connect directly between the facility 110D and facility 110C. When one of the circuits 120 terminates at one of the facilities 110, the facility or node may be referred to as an ingress or egress node for the circuit. Similarly, the circuit 120 may be said to add or drop at the facility 110.

When one of the circuits 120 passes through one of the facilities 110, a physical resource associated with the circuit, such as an optical fiber or cable, may pass through the facility without being terminated. Alternatively, the circuit 120 passing through the facility 110 may be terminated and regenerated, patched, or otherwise processed within the facility. The circuit 120 terminating as it passes through the facility 110, or connecting to another one of the circuits 120 within the facility 110, may be said to hop at that facility 110 on to another facility 110. As such, the circuit 120 may be made up of two or more other circuits 120 or links. The links may provide hops between one or more intermediate nodes, or the facilities 110 making up the total circuit 120. For example, the circuit 120 may be established from the facility 110D to facility 110B using the circuit 120F from the facility 110D to facility 110C and then hopping from the facility 110C to facility 110B using the circuit 120D. Communications from the facility 110D to facility 110B may also be established using the circuit 120B or using the circuit 120E. The combination of the circuit 120A and circuit 120D may also be used to establish communications from the facility 110D to facility 110B.

According to exemplary embodiments, there are at least four circuits, or combined circuits, for connecting between the facility 110D and facility 110B. Any two of these may be selected as a primary and backup pair. Such a pairing may be established with the hope that the backup circuit may remain operational even in the case of a failure in the primary circuit. This may be important when communications between the facility 110D and facility 110B are mission critical. Mission critical circuits may be provided by a communication carrier along with a guaranteed or implied level of service to support a reduced failure probability. Increasing the diversity between the primary circuit and the backup circuit can decrease the probability that a failure in the primary circuit implies a failure in the secondary circuit. Thus increased diversity can support increased reliability.

Two circuits may form a primary/secondary pair for communications between the facility 110D and facility 110B. As a first example, the primary circuit may include the circuit 120B while the secondary circuit may include the combination of the circuit 120A and circuit 120D. In this first example configuration, both the primary and secondary circuits pass through the facility 110A. A power failure, cable cut, fire, or other failure at the facility 110A may result in a loss of both the primary circuit and the secondary circuit. In a second example, the primary circuit may include the circuit 120B while the secondary circuit may include the combination of the circuit 120F and circuit 120D. In the second example configuration, the secondary circuit does not pass through facility 110A. Thus, a failure at facility 110A may result in a loss of the primary circuit, but the secondary circuit may remain operational as a backup. The pairing in the second example may be said to have a higher diversity, or to be more diverse, than the pairing of the first example, since the pairing of the second example is of circuits not sharing links or intermediate node facilities.

Details concerning the architecture and configuration of the communications network can be stored to a link data warehouse 180. Information from the link data warehouse 180 may then be provided to the diversity analysis subsystem 200 as discussed in further detail with respect to FIG. 2.

Figure 2:
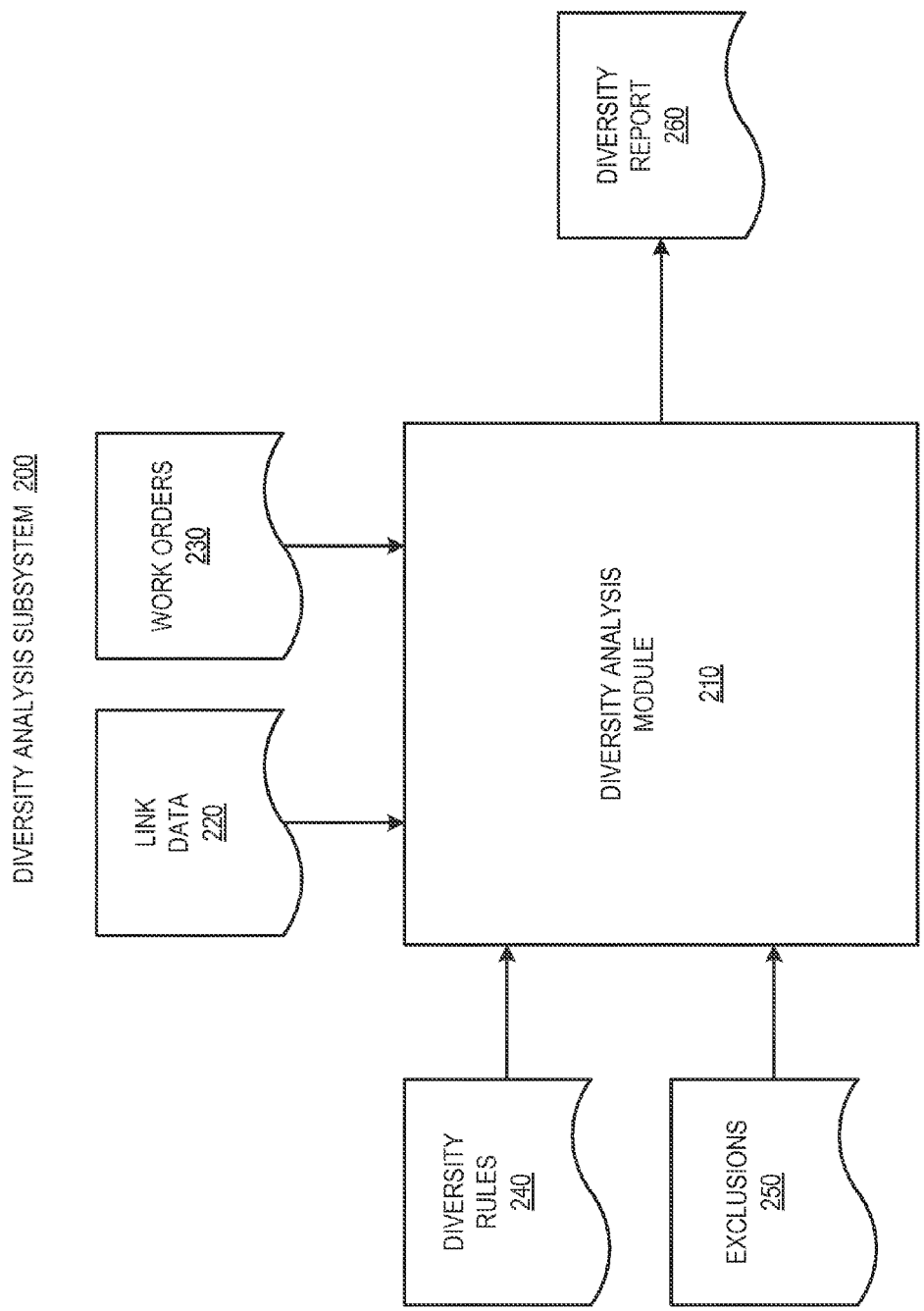
FIG. 2 is a block diagram illustrating a diversity analysis subsystem, in accordance with one or more embodiments presented herein.

Referring now to FIG. 2, a block diagram illustrates the diversity analysis subsystem 200 in accordance with one or more embodiments presented herein. Link data 220, such as details concerning the architecture and configuration of a communications network, may be provided to a diversity analysis module 210. The diversity analysis module 210 may be a computer based method implemented as software within a computing system as discussed with respect to FIG. 4. The diversity analysis module 210 may also be implemented as an automated system of software modules, firmware modules, hardware modules, or any combination thereof according to various embodiments.

The link data 220 may be received from a database such as the link data warehouse 180. The link data 220 may specify assorted configuration information related to the links and circuits 120 of the communications network. The configuration information may include a specification of critical circuits to be verified for adequate diversity. The specification of the critical circuits may be static, or the specified circuits may vary over time. The configuration information may also include the endpoints of a circuit as well as hops or intermediate nodes of the circuit. Various additional information may be provided within the link data 220 such as bandwidth, circuit type, customer identification, service level specifications, primary or secondary status, and so forth. The link data 220 may be derived from a Trunk Integrated Record Keeping System (TIRKS).

Diversity rules 240 may be specified to the diversity analysis module 210. The diversity rules 240 may specify what resources may, or may not, be shared between a primary and secondary circuit in order for the conditions of diversity to be satisfied. For example, a rule may specify that a primary/secondary pair may not pass through a common building or location. Another rule may specify that the primary/secondary pair may pass through a common building as long as they are both not added or dropped within the building. Other physical resources may be specified within the diversity rules 240 as sharable or not, such as racks, power supplies, switches, conduits, cables, fibers, wavelengths, time slots, frequencies, vaults, cabinets, antennas, lasers, receivers, transmitters, passive optical elements, radio frequency components, interface cards, interface modules, demarcation points, customer sites, trunks, any other communications resource, or any combination thereof.

The diversity analysis module 210 can apply the diversity rules 240 to the link data 220 to determine which, if any, of the specified circuits satisfy the provided diversity rules 240 and which do not. A diversity report 260 may be generated by the diversity analysis module 210 to indicate the diversity status of the specified circuits to a user, operator, or to another automated system. A diversity report may include statistics of diversity, a history of circuit diversity, visualizations such as charts and tables, as well as various other indicators of the diversity status of the communications network and the associated circuits 120.

Exclusions 250 may be specified to the diversity analysis module 210. The exclusions 250 can indicate known apparent violations of the diversity rules 240 that may be ignored. For example, one of the exclusions 250 may be an improperly identified diversity fault that only shows as a fault because of a measuring or reporting mechanism. The exclusions 250 may specify known conditions to be marked within the diversity report 260 as exclusions when they are matched from a list of the exclusions 250. As such, a user or system examining the diversity report 260 may know to disregard the diversity fault that is noted as one of the exclusions 250. Any statistics, analysis, or illustrations provided in association with the diversity report 260 may be configured to exclude circuits violations marked as one of the exclusions 250. In order to prevent one of the exclusions 250 from getting permanently ignored within the diversity analysis subsystem 200, a list of the exclusions 250 may have expiration dates and times for each entry, a global expiration period may be imposed, or some other expiration or retirement protocol may be enacted for exclusion 250 entries.

Work orders 230 may be specified to the diversity analysis module 210. The work orders 230 may contain a list of future, or proposed, modifications to the communication network. The diversity analysis module 210 can analyze the proposed modifications from the work orders 230 and indicate within the diversity report 260 when a proposed network modification may threaten the diversity of the communications network.

The circuits 120 may provide communication links between locations regulated by the Federal Aviations Administration (FAA) such as air traffic control facilities, or other such mission critical communication installations. As such, the diversity rules 240 may be defined by the user or administrator of the critical circuits 120, such as the FAA in the air traffic control example.

The diversity report 260 may list all the circuits 120 along with the associated sites and their link hops. The diversity report 260 may list all TIRKS inventoried equipment and facilities associated with each respective circuit 120. The diversity report 260 can support a global search by equipment where different criteria can allow broader or narrower search criteria depending upon the need of the search. Each circuit 120 within the diversity report 260 may also be listed with specific equipment and facilities associated with that circuit 120. This information may be leveraged when there is a facility or equipment outage implying an urgent situation for finding critical service depending upon the equipment or facility. The information may also be leveraged for planning purposes to identify critical services on equipment or facilities prior to rearranging or retiring the associated network resources.

The diversity report 260 may also provide a performance report showing the percentage of diverse sites. The percentage of diverse sites may be sorted by state, region, customer, or other criteria. The performance report may also be divided by area to support visibility into details down to the circuit level.

Application of the diversity analysis module 210 can support an automated solution requiring reduced human intervention to identify potentially serious diversity violations within a communications network. This approach can save time, reduce errors, and may be adaptable to various network scenarios and architectures.

Figure 3:
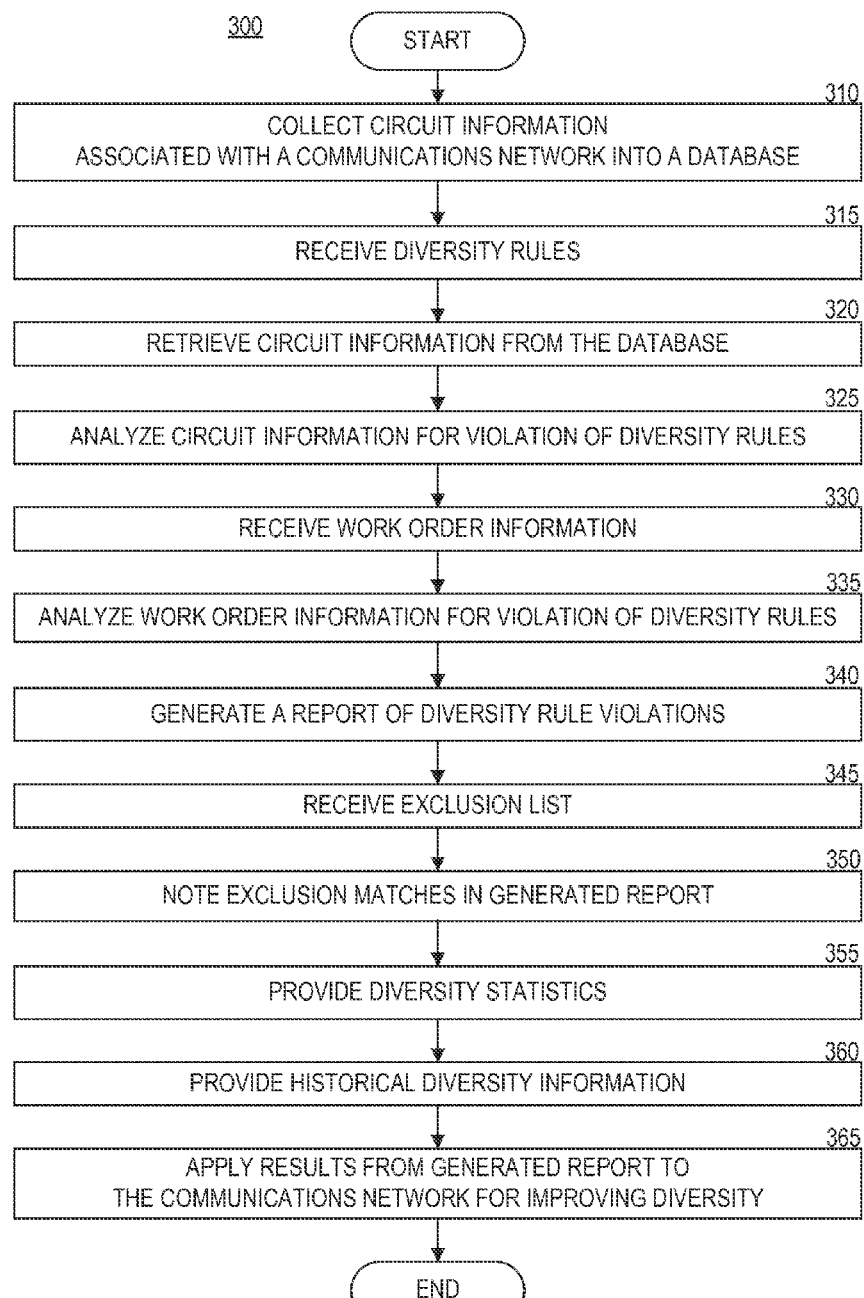
FIG. 3 is a flow diagram illustrating an exemplary method for monitoring diversity among communication network circuits, in accordance with one or more embodiments presented herein.

Referring now to FIG. 3, additional details will be provided regarding some embodiments described herein for generating and implementing diversity monitoring within the communication circuits 120. In particular, FIG. 3 is a flow diagram illustrating an exemplary method 300 for monitoring diversity among the communication network circuits 120, in accordance with one or more embodiments presented herein. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring now to FIG. 3, the method 300 begins at operation 310, where circuit information associated with a communications network is collected into a database. The circuit information may include the link data 220 as well as indicators of one or more critical circuits. The circuit information may also include the work orders 230, exclusions 250, or various configuration information related to the circuits 120 of the communications network. The database may be the link data warehouse 180 or other storage mechanism for collecting and aggregating information related to the communication circuits 120.

At operation 315, a set of diversity rules, such as the diversity rules 240, may be received. The diversity rules 240 can indicate the desired diversity status of the circuits 120 within the communications network. For example, network resources that may, or may not, be shared between primary and secondary circuits within the network may be specified.

At operation 320, circuit information may be retrieved from the database. The circuit information collected at operation 310 may be retrieved for diversity analysis. At operation 325, circuit information may be analyzed for violation of the diversity rules 240.

At operation 330, information regarding the work orders 230 may be received by the diversity analysis module 210. The work orders 230 may be analyzed in operation 335 for violation of the diversity rules 240. Testing pending work orders 230 against the diversity rules 240 can provide advance warning against carrying out a work order when doing so may compromise the diversity of circuits 120 within the communications network.

At operation 340, a diversity report, such as the diversity report 260, may be generated. The diversity report 260 can provide a list of diversity rule violations as well as diversity statistics, metrics, histories, and visualizations.

At operation 345, a list of exclusions, such as exclusions 250, may be received by the diversity analysis module 210. At operation 350, matches from the list of exclusions 250 within the diversity report 260 may be indicated within the diversity report 260 as exclusions. Such indication can imply that the noted circuit diversity faults are known to be false positive identifications.

At operation 355, diversity statistics may be generated. The generated statistics may be provided in association with the diversity report 260. The diversity report 260 may also include visualizations of information such as the generated diversity statistics. The visualizations may include plots, charts, tables, pie charts, or other graphical data visualization mechanisms. At operation 360, historical diversity information may be provided. The historical diversity information may be provided in association with the diversity report 260 and may also be incorporated into the visualizations.

At operation 365, results from the diversity report 260 may be applied to the communications network to improve diversity. Entries in the diversity report 260 indicating one or more failed diversity rules for a given circuit 120 or primary/secondary pair may be identified for correction. According to various embodiments, the identified circuits failing one or more diversity criteria may be manually or automatically reconfigured to increase adherence to the diversity rules 240.

Application of the method 300 to a communication network may be repeated or applied periodically. For example, the method 300 may be applied every minute, every hour, daily, once a week, or so forth to monitor violations of the diversity rules 240, generate the diversity reports 260, or attempt to reconfigure network resources to improve diversity.

Figure 4:
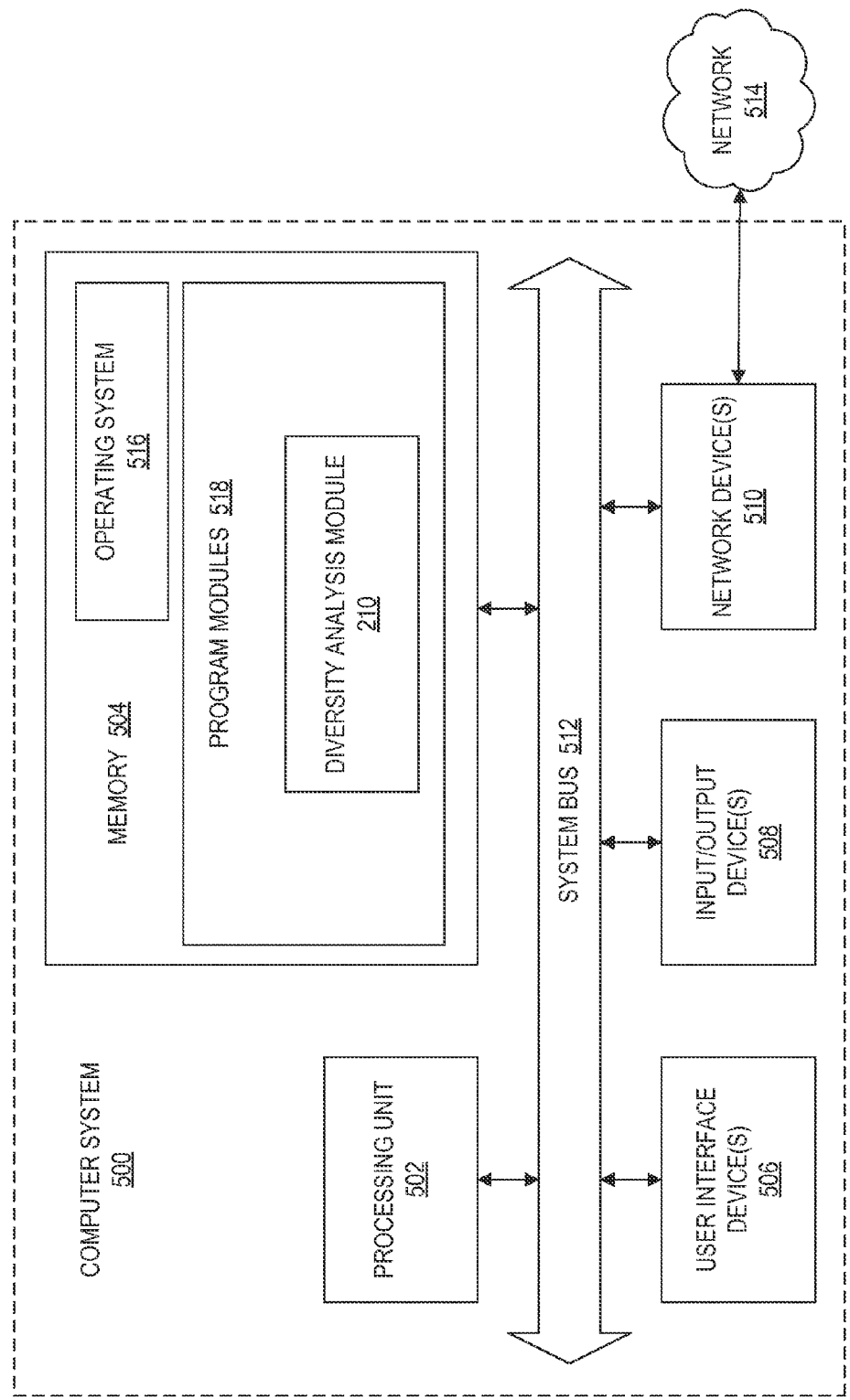
FIG. 4 is a block diagram illustrating an exemplary system configured to generate and implement network diversity analysis, in accordance with one or more embodiments presented herein.

FIG. 4 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 4 is a block diagram illustrating a computer system 500 configured to implement diversity monitoring for communication network circuits, in accordance with embodiments presented herein. Examples of the computer system 500 may support the diversity analysis module 210 within the diversity analysis subsystem 200. The computer system 500 includes a processing unit 502, a memory 504, one or more user interface devices 506, one or more input/output (I/O) devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller (PLC), a programmable gate array, or other type of processor known to those skilled in the art and suitable for controlling the operation of the server computer. Processing units are well-known in the art, and therefore not described in further detail herein.

The memory 504 communicates with the processing unit 502 via the system bus 512. In one embodiment, the memory 504 is operatively connected to a memory controller (not shown) that enables communication with the processing unit 502 via the system bus 512. The memory 504 includes an operating system 516 and one or more program modules 518, according to exemplary embodiments. Examples of operating systems, such as the operating system 516, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Examples of the program modules 518 can include the diversity analysis module 210 or any other program for implementing, in part or in full, the method 300. In some embodiments, the program modules 518 are embodied in computer-readable media containing instructions that, when executed by the processing unit 502, performs the method 300 for monitoring diversity in communication network circuits, as described in greater detail above with respect to FIG. 3. According to embodiments, the program modules 518 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system 500.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 518. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network 514. Examples of the network devices 510 may include, but are not limited to, a modem, a radio frequency (RF) or infrared (IR) transceiver, a telephonic interface, a bridge, a router, or a network card. The network 514 may include a wireless network such as, but not limited to, a Wireless Local Area Network (WLAN) such as a WI-FI network, a Wireless Wide Area Network (WWAN), a Wireless Personal Area Network (WPAN) such as BLUETOOTH, a Wireless Metropolitan Area Network (WMAN) such a WiMAX network, or a cellular network. Alternatively, the network 514 may be a wired network such as, but not limited to, a Wide Area Network (WAN) such as the Internet, a Local Area Network (LAN) such as the Ethernet, a wired Personal Area Network (PAN), or a wired Metropolitan Area Network (MAN).

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for monitoring a communications network, the method comprising:
   gathering, by a computer, information regarding circuits within the communications network;
   receiving, by the computer, diversity rules for the circuits, the diversity rules indicating desired diversity statuses of the circuits within the communications network;
   analyzing, by the computer, the information regarding the circuits to identify violations of the diversity rules;
   receiving, by the computer, a work order comprising a list of proposed modifications to the communications network;
   analyzing, by the computer, the work order to identify further violations of the diversity rules that would occur if the list of proposed modifications to the communications network were implemented;
   generating, by the computer, a diversity report comprising the violations of the diversity rules, the diversity report further comprising an indication of the further violations of the diversity rules that would occur if the list of proposed modifications to the communications network were implemented;
   receiving, by the computer, an exclusion list specifying known violations that are to be marked within the diversity report as exclusions to be ignored, wherein the exclusion list comprises expiration dates and times for each of the exclusions in order to prevent the exclusions from being permanently ignored, and wherein one of the exclusions comprises an improperly identified diversity fault that only shows as a fault because of a measuring mechanism;
   matching a known violation from the exclusion list to a violation of the diversity rules from the diversity report, wherein the violation of the diversity rules from the diversity report matching the known violation comprises a false positive identification that can be ignored for purposes of applying results from the diversity report to the communications network to improve diversity of the communications network;
   marking, by the computer in the diversity report, the violation of the diversity rules that matches the known violation from the exclusion list as an exclusion; and
   causing, by the computer, the results from the diversity report to be applied to the communications network to improve the diversity of the communications network.

2. The method of claim 1, wherein the diversity report comprises diversity statistics.

3. The method of claim 1, wherein the diversity report comprises historical diversity information.

4. The method of claim 1, wherein the circuits comprise communication links between air traffic control facilities.

5. The method of claim 1, wherein the diversity rules apply to pairs of primary and secondary circuits.

6. The method of claim 1, wherein the diversity report comprises visualizations associated with diversity information.

7. A system for monitoring communication circuits, the system comprising:
   a processor; and
   a memory that stores instructions which, when executed by the processor, cause the processor to perform operations comprising
      gathering information regarding the communication circuits,
      receiving diversity rules for the communication circuits, the diversity rules indicating desired diversity statuses of the communication circuits within a communications network,
      analyzing the information regarding the communication circuits to identify violations of the diversity rules,
      receiving a work order comprising a list of proposed modifications to the communications network,
      analyzing the work order to identify further violations of the diversity rules that would occur if the list of proposed modifications to the communications network were implemented,
      generating a diversity report comprising the violations of the diversity rules, the diversity report further comprising an indication of the further violations of the diversity rules that would occur if the list of proposed modifications to the communications network were implemented,
      receiving an exclusion list specifying known violations that are to be marked within the diversity report as exclusions to be ignored, wherein the exclusion list comprises expiration dates and times for each of the exclusions in order to prevent the exclusions from being permanently ignored, and wherein one of the exclusions comprises an improperly identified diversity fault that only shows as a fault because of a measuring mechanism, matching a known violation from the exclusion list to a violation of the diversity rules from the diversity report, wherein the violation of the diversity rules from the diversity report matching the known violation comprises a false positive identification that can be ignored for purposes of applying results from the diversity report to the communications network to improve diversity of the communications network, marking, in the diversity report, the violation of the diversity rules that matches the known violation from the exclusion list as an exclusion, and causing the results from the diversity report to be applied to the communications network to improve the diversity of the communications network.

8. The system of claim 7, wherein the diversity report comprises diversity statistics.

9. The system of claim 7, wherein the diversity report comprises historical diversity information.

10. The system of claim 7, wherein the communication circuits comprise communication links between air traffic control facilities.

11. The system of claim 7, wherein the diversity rules apply to pairs of primary and secondary circuits.

12. The system of claim 7, wherein the diversity report comprises visualizations associated with diversity information.

13. The system of claim 12, wherein the visualizations comprise one of plots, charts, tables, pie charts, and other graphical data visualization mechanisms.

14. A non-transitory computer-readable medium having instructions stored thereon that, when executed by a processor, cause the processor to perform operations comprising:

gathering information regarding circuits within a communications network;

receiving diversity rules for the circuits, the diversity rules indicating desired diversity statuses of the circuits within the communications network;

analyzing the information regarding the circuits to identify violations of the diversity rules;

receiving a work order comprising a list of proposed modifications to the communications network;

analyzing the work order to identify further violations of the diversity rules that would occur if the list of proposed modifications to the communications network were implemented;

generating a diversity report comprising the violations of the diversity rules, the diversity report further comprising an indication of the further violations of the diversity rules that would occur if the list of proposed modifications to the communications network were implemented;

receiving an exclusion list specifying known violations that are to be marked within the diversity report as exclusions to be ignored, wherein the exclusion list comprises expiration dates and times for each of the exclusions in order to prevent the exclusions from being permanently ignored, and wherein one of the exclusions comprises an improperly identified diversity fault that only shows as a fault because of a measuring mechanism;

matching a known violation from the exclusion list to a violation of the diversity rules from the diversity report, wherein the violation of the diversity rules from the diversity report matching the known violation comprises a false positive identification that can be ignored for purposes of applying results from the diversity report to the communications network to improve diversity of the communications network marking, in the diversity report, the violation of the diversity rules that matches the known violation from the exclusion list as an exclusion; and causing the results from the diversity report to be applied to the communications network to improve the diversity of the communications network.

15. The non-transitory computer-readable medium of claim 14, wherein the diversity report comprises diversity statistics.

16. The non-transitory computer-readable medium of claim 14, wherein the diversity report comprises visualizations associated with diversity information.

17. The non-transitory computer-readable medium of claim 16, wherein the visualizations comprise one of plots, charts, tables, pie charts, and other graphical data visualization mechanisms.

18. The non-transitory computer-readable medium of claim 14, wherein the circuits comprise communication links between air traffic control facilities.

19. The non-transitory computer-readable medium of claim 14, wherein the diversity rules apply to pairs of primary and secondary circuits.

20. The non-transitory computer-readable medium of claim 14, wherein the diversity report comprises historical diversity information.

* * * * *